US008744987B1

(12) United States Patent
Forman et al.

(10) Patent No.: US 8,744,987 B1
(45) Date of Patent: Jun. 3, 2014

(54) COUNT ESTIMATION VIA MACHINE LEARNING

(75) Inventors: George Henry Forman, Port Orchard, WA (US); Henri Jacques Suermondt, Sunnyvale, CA (US); Evan Randy Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1028 days.

(21) Appl. No.: 11/406,689

(22) Filed: Apr. 19, 2006

(51) Int. Cl.
*G06F 15/18* (2006.01)
(52) U.S. Cl.
USPC ............................................................ 706/20
(58) Field of Classification Search
USPC ............................................................ 706/20
See application file for complete search history.

(56) References Cited

U.S. PATENT DOCUMENTS

| | | | | |
|---|---|---|---|---|
| 5,214,746 | A * | 5/1993 | Fogel et al. .................... | 706/25 |
| 6,633,882 | B1 * | 10/2003 | Fayyad et al. ................. | 707/101 |
| 6,823,323 | B2 * | 11/2004 | Forman et al. ................. | 706/20 |
| 2006/0206443 | A1 * | 9/2006 | Forman et al. ................. | 706/20 |

OTHER PUBLICATIONS

"Counting Positives Accurately Despite Inaccurate Classification", George Forman, Hewlett-Packard Labs, Machine Learning, ECML 2005, LNAI 3720, Nov. 15, 2005, pp. 564-575.*
Saerens M. et al., "Adjusting the Outputs of a Classifier to New a Priori Probabilities: A simple procedure", Neural Computation 14, 21-41, 2001.
Latinne, P. et al., "Adjusting the Outputs of a Classifier to New a Priori Probabilities May Significantly Improve Classification Accuracy: Evidence from a Multi-class Problem in Remote Sensing", 2001.

* cited by examiner

*Primary Examiner* — Kakali Chaki
*Assistant Examiner* — Mai T Tran

(57) ABSTRACT

One or more machine learning classifiers are trained to classify cases in one or more categories using one or more sets of labeled training data. A first distribution of scores for positive cases in the training set is determined for each category, and a second distribution of scores for negative cases in the training set is determined for each category. A third distribution of scores is generated by each classifier classifying cases in a set of target data is also determined. A proportion of cases in the target set that are positive cases for a category is estimated by fitting the first distribution and the second distribution for the category to the third distribution.

20 Claims, 12 Drawing Sheets

COUNT ESTIMATION VIA MACHINE LEARNING

BACKGROUND

In recent years, machine learning applications, which typically include computer applications learning from a set of examples to perform a recognition task, have becoming increasingly popular. A task typically performed by these types of machine learning applications is classification, such as automatically classifying documents under one or more topic categories. This technology is used in filtering, routing and filing information, such as news articles or web pages, into topical directories or e-mail inboxes. For example text documents may be represented using a fixed set of attributes, each representing the number of times a particular key word appears in the document. Using an induction algorithm, also referred to as a classifier learning algorithm, that examines the input training set, the computer 'learns' or generates a classifier, which is able to classify a new document under one or more categories. In other words, the machine learns to predict whether a text document input into the machine, usually in the form of a vector of predetermined attributes describing the text document, belongs to a category. When a classifier is being trained, classifier parameters for classifying objects are determined by examining a training set of objects that have been assigned labels indicating to which category each object in the training set belongs. After the classifier is trained, the classifier's goal is to predict to which category an object provided to the classifier for classification belongs.

In the field of machine learning, trained classifiers may be used for the purpose of a count of the number of unlabeled objects that are classified in a particular category. In such applications the actual counts are of particular interest rather than the individual classifications of each item. As an example, an automated classifier may be used to estimate how many documents in a business news wire are related to a particular company of interest. Another example is where a news company uses a classifier to determine under which major topic each incoming news article should be filed. In order to determine the percentage of articles filed under one particular category each month, one could count how many articles are predicted by the classifier to belong in this category. This is advantageous so that the relative level of interest in a particular topic can be tracked.

A problem with the present automated classifiers is that, in practice, the automated classifiers that assign objects to categories make mistakes. The mistakes made by the classifier do not always cancel one another out. For example, so-called false positives, instances of mistakenly assigning an object to a category, are not always offset by so-called false negatives, instances of mistakenly failing to assign an object to a category. Instead, classification errors tend to be biased in one direction or the other, so it is difficult to obtain an accurate count of the number of objects that should be classified under a particular category.

BRIEF DESCRIPTION OF THE DRAWINGS

Various features of the embodiments can be more fully appreciated, as the same become better understood with reference to the following detailed description of the embodiments when considered in connection with the accompanying figures.

DETAILED DESCRIPTION

For simplicity and illustrative purposes, the principles of the embodiments are described. Moreover, in the following detailed description, references are made to the accompanying figures, which illustrate specific embodiments. Changes may be made to the embodiments without departing from the spirit and scope of the embodiments.

Figure 1:
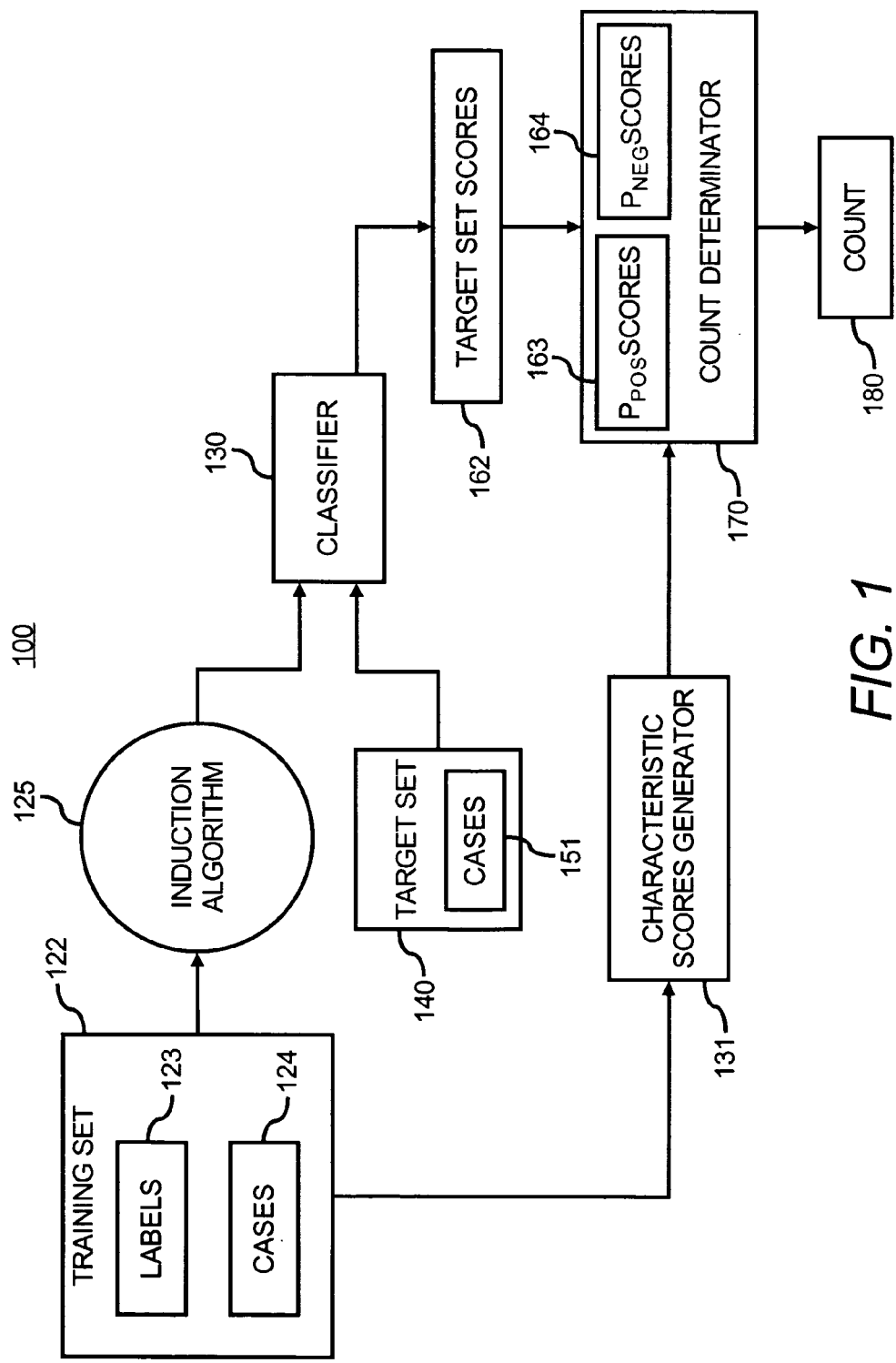
FIG. 1 illustrates a system for determining a count of cases, according to an embodiment.

FIG. 1 illustrates a machine learning system 100 operable to estimate a count of positive cases in a set of target data, according to an embodiment. The system 100 includes a training set 122, including labels 123 and cases 124, an induction algorithm 125 and a classifier 130. The cases 124 in the training set include the labels 123 identifying whether a particular case is positive or negative with respect to a category. A positive case is a case that belongs to the category, and a negative case is a case that does not belong to the category. For example, if the cases 124 are emails and the category is spam, a label for a positive case indicates that the case is spam and a label for a negative case indicates that the email is not spam. Emails are one example of a type of case. A case is data to be classified. Other examples of cases include documents, speech, or other types of data to be classified. For example, a case represents an interaction between a business entity and a customer or supplier, such as a purchase inquiry or bid, a visit to a store or web site, a call to a customer-support phone line, or an e-mailed comment or complaint. In another example, the case represents a document, such as an e-mail message, newspaper article, or technical note. In another example, a case represents an observation or inference about the state of a managed or unmanaged system, such as a computer system, stock market, climate, population, economy, or army. In another example, a case a physical entity, such as a person, animal, item for sale, or vehicle; or it may represent anything else with which data may be associated. A category represents any determination which does or does not correctly characterize a case. Examples of categories include "the caller's product has a broken screen", "the constituent's e-mail is about global warming", "the patient has lung cancer", "the system is overloaded", "the article is about baseball", or "the phone call is fraudulent".

In the training phase, the training set 122 is used as input for the induction algorithm 125. Examples of the induction algorithm 125 include one of Naive Bayes, Multinomial Naive Bayes, C4.5 decision trees, Support Vector Machines, neural networks, or other known induction algorithms. Running the induction algorithm 125 using the training set 122 as input generates the classifier 130, trained to classify cases in one or more categories, such as for example the spam category for emails.

After the classifier 130 is trained, the classifier 130 is used to classify cases without labels to determine predictions of whether the cases belong to one or more categories for which the classifier 130 was trained. For example, the classifier 130 is used to classify cases 151 in a target set 140, which comprises cases without labels. The classifier 130 generates target set scores 162, which include predictions for each of the cases 151 in the target set 140. The predictions include scores. Examples of scores operable to be generated by the classifier 130, not by way of limitation, include a binary prediction, such as a yes or no decision with regard to whether a case belongs to a category, a probability of whether a case belongs to the category, or a value indicative of whether a case belongs to a category. For example, a score may be a value between 0 and 1, inclusive, representative of whether a case belongs to the category. For example, the higher the score, the greater the probability the case is positive, and the lower the score, the greater the probability that the case is negative. According to another embodiment, the scores produced by the classifier 130 do not directly give an indication of greater or lesser likelihood of being in the category.

A count determinator 170 determines a count 180 of the number of cases 151 in the target set 150 that meet a predetermined criteria. In one example, the count 180 is the number of cases 151 in the target set 140 that are positive. The count 180, for example, is a number, a range or a percentage. For example, the count 180 is the proportion of the cases 151 in the target set 150 that are positive. The count 180 is an estimate. In another example, the predetermined criterion is negative cases, and the count 180 is the number of cases 151 in the target set 150 that are negative.

According to an embodiment, the count determinator 170 determines the count 180 by curve fitting one or more distributions of scores for the positive and negative cases of the cases 124 to a distribution of the target set scores 162, as described in further detail below. In this embodiment, the count determinator 170 determines the count 180 without having the classifier 130 make a definitive prediction about whether each of the cases 151 of the target set 140 are positive or negative. According to an embodiment, the count determinator 170 uses classifier scores and does not use its classification threshold in a final step to predict either the positive or the negative class. For example, after training of the classifier 130, a characteristic scores generator 131 determines positive and negative scores, such as $P_{POS}$ scores 163 and $P_{NEG}$ scores 164, that are characteristic of the performance of the classifier 130. For example, the characteristic scores generator 131 uses cross-validation, repeated random sampling or other techniques known in the art to determine scores for the cases 124 in the training set 122 that are characteristic of the performance of the classifier 130. Cross-validation, for example, is n-fold cross-validation. For example, 50-fold cross-validation is operable to be used but other numbers of folds are also operable to be used. The count determinator 170 estimates a count of the positive cases of the target set of cases 151 by fitting a combination of distributions for the $P_{POS}$ scores 163 and the $P_{NEG}$ scores 164 to a distribution for the target set scores 162.

Figure 2:
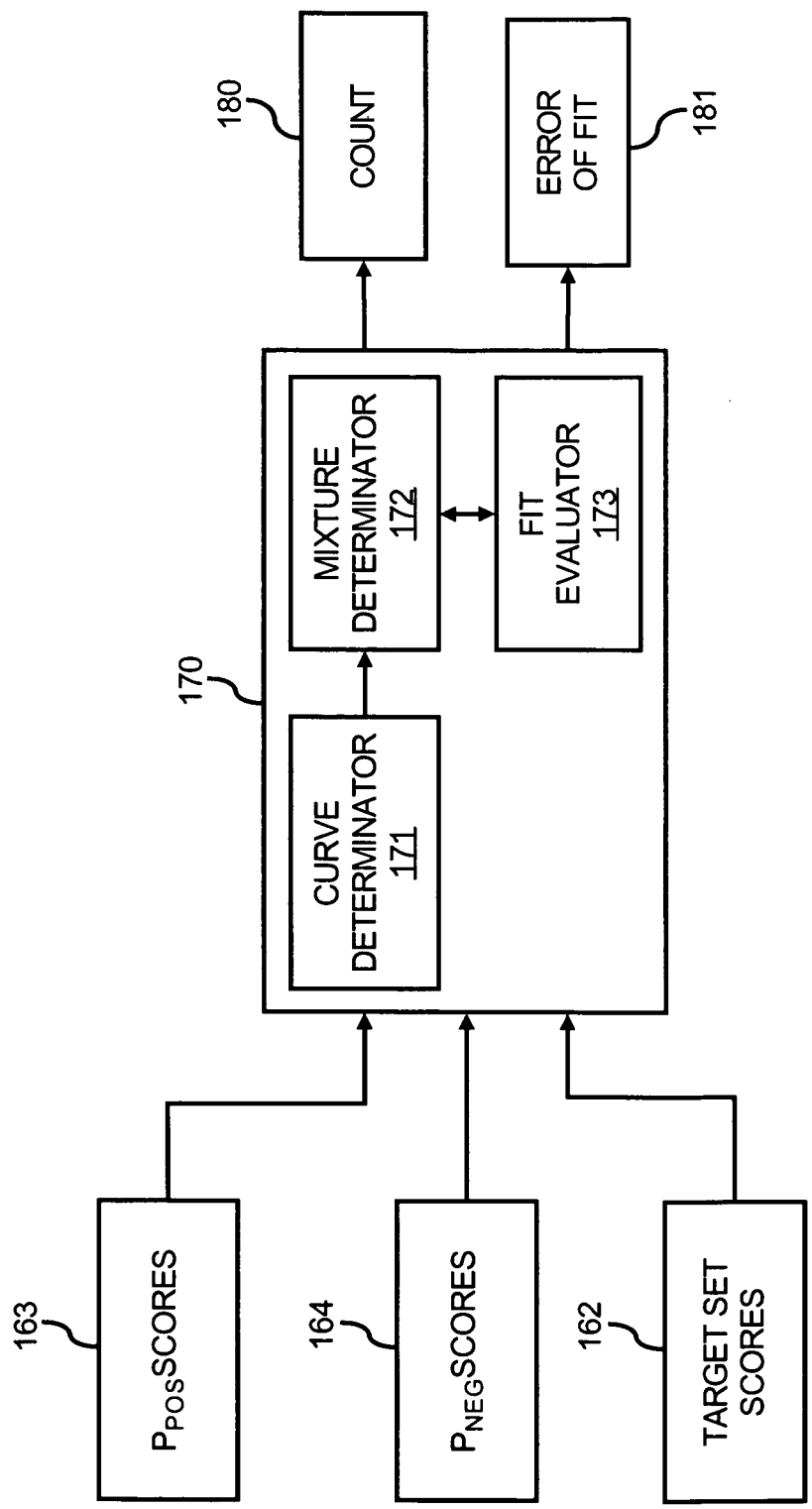
FIG. 2 illustrates a count determinator, according to an embodiment.

FIG. 2 illustrates a more detailed block diagram of the count determinator 170, according to an embodiment. The count determinator 170 includes a curve determinator 171, a mixture determinator 172 and a fit evaluator 173. The curve determinator 170 determines a distribution of scores for different sets of cases. The distribution of scores, for example, are determined using a probability density function (PDF) or a cumulative distribution function (CDF), as is known in the art.

Figure 3:
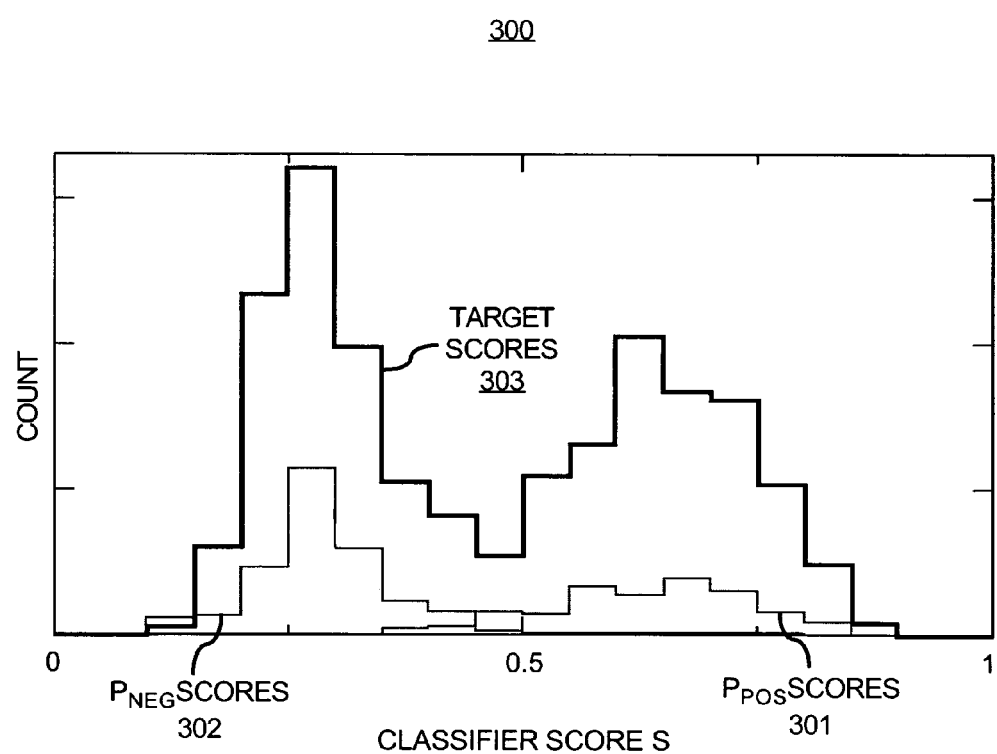
FIG. 3 illustrates a graph of probability density distribution curves for scores according to an embodiment.

FIG. 2 also shows the $P_{POS}$ scores 163, $P_{NEG}$ scores 164, and the target set scores 162 from FIG. 1 used as input for the count determinator 170. The curve determinator 171 determines the distribution of scores for the $P_{POS}$ scores 163, $P_{NEG}$ scores 164, and the target set scores 162. For example, the distribution of scores are determined using a PDF, such as a histogram of the scores. FIG. 3 illustrates a PDF curve 301 for the $P_{POS}$ scores 163 and a PDF curve 302 for the $P_{NEG}$ scores 164 comprising a histogram of scores for the training set 122. In the graph 300, the x-axis represents the scores and the y-axis represents a count of the scores. When the range of possible scores is continuous or has a large number of discrete values, it may be broken up into ranges, with each score being replaced by a characteristic score within the range, such as the midpoint of the range.

The curve determinator 171 also determines a distribution of scores for the target set scores 162 shown in FIG. 2. FIG. 3 illustrates a PDF curve 303 for the target scores 162.

Figure 4A:
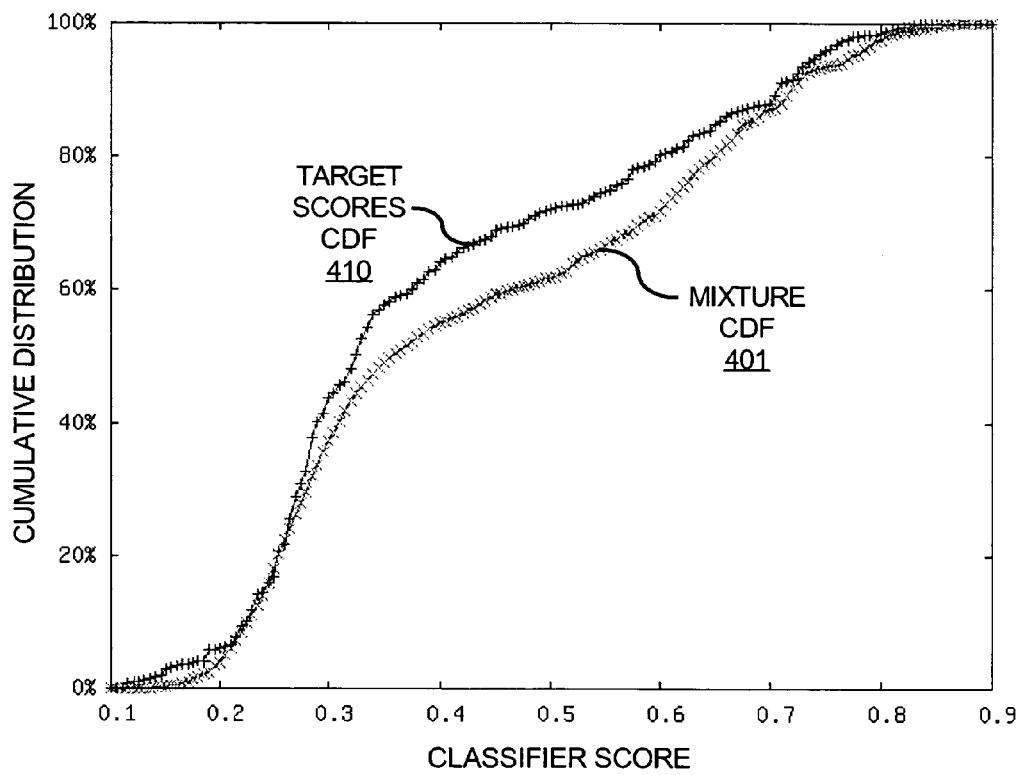
FIGS. 4A-B illustrate graphs of cumulative distribution curves for scores, according to an embodiment.
Figure 4B:
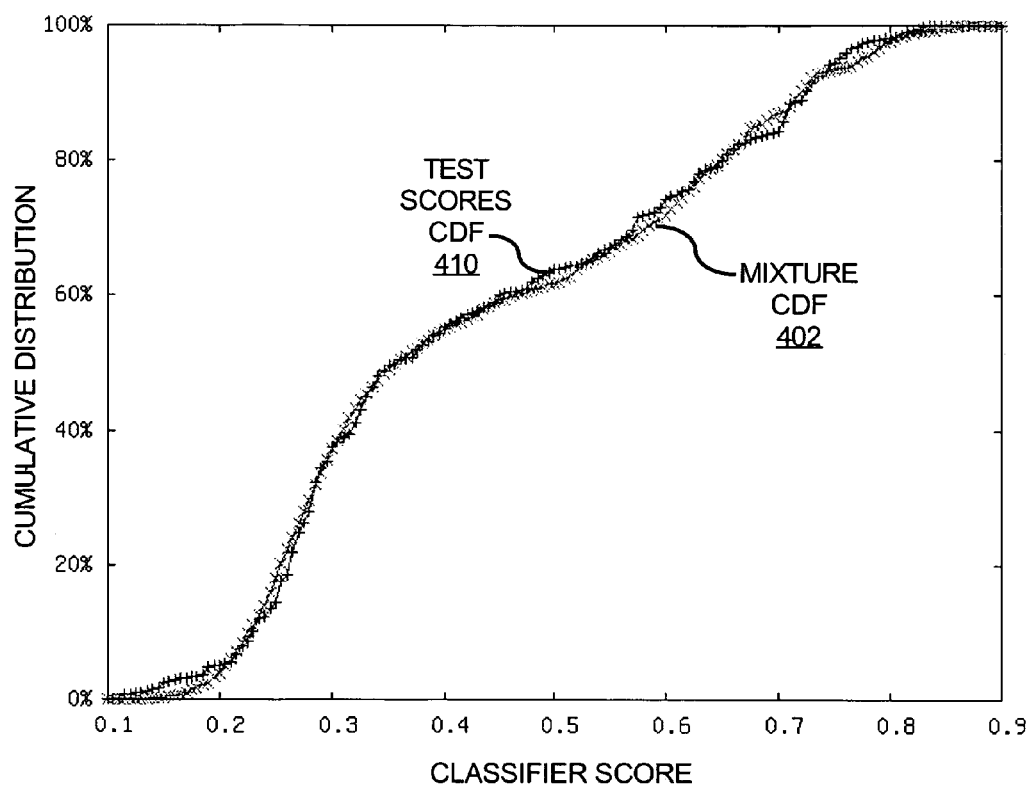

In another embodiment, the curve determinator 171 determines CDF curves for the $P_{POS}$ scores 163, $P_{NEG}$ scores 164, and the target set scores 162. CDF curves include an accumulation for each set of scores. Examples of the CDF curves are shown in FIGS. 4A-B, described in detail below. Using cumulative distributions instead of probability density distributions to determine the count 180 is advantageous because scores are operable to be sorted without performing the binning described above. Also, cumulative distributions are likely more robust to little shifts in the score axis. However, either cumulative distributions or probability density distributions are operable to be used to determine the count 180.

The mixture determinator 172 is operable to determine several mixtures for the $P_{POS}$ scores 163 and the $P_{NEG}$ scores 164. A mixture is a combination of the distributions for the $P_{POS}$ scores 163 and the $P_{NEG}$ scores 164. The mixture, for example, is a weighted sum of the $P_{POS}$ scores 163 and the $P_{NEG}$ scores 164. For example, the mixture is represented as "p" times the distribution of the $P_{POS}$ scores 163 plus "n" times the distribution of the $P_{NEG}$ scores 164, where "p" and "n" are the weights for the $P_{POS}$ scores 163 and the $P_{NEG}$ scores 164 respectively. The several mixtures determined by the mixture determinator 172, for example, are weighted differently. For example, different mixtures are weighted more heavily for the positive scores or the negative scores to find the mixture that is the best fit. A control loop between the mixture determinator 172 and the fit evaluator 173, for example, is used to find a mixture that is the best fit or a good fit. The bi-directional arrow between the mixture determinator 172 and the fit evaluator 173, for example, represents a control loop including the mixture determinator 172 and the fit evaluator 173 for generating several mixtures and evaluating the fit of the mixtures for selecting a mixture that is a good or the best fit for estimating the count 180. Thus, the curve fitting is optimized to minimize the error in the fit for generating an accurate estimate of the count of positive cases in the target set 140.

In one embodiment, the multiple mixtures generated for evaluation are determined by trying different weights for the $P_{POS}$ scores 163 and/or the $P_{NEG}$ scores 164 in a consecutive manner. For example, a first mixture is determined using 0% of the $P_{POS}$ scores 163 and 100% of the $P_{NEG}$ scores 164, a second mixture is determined using 1% of the $P_{POS}$ scores 163 and 99% of the $P_{NEG}$ scores 164, and so on, in sequence up to 100%. The percentage of positives that provides that best fit or one of the best fits, as observed/measured by the fit evaluator 173 is selected for determining the count 180.

If a greater degree of precision is needed for the count estimate 180, once it has been determined that, for example, a mixture of 73% of the $P_{POS}$ scores 163 and 17% of the $P_{NEG}$ scores 164 is a better fit than any of the other mixtures tried, a further pass can be made in which mixtures are tried in increments of, for example, 0.1% from 72.5% to 73.5%. In another embodiment, a known search algorithm is used to find one or more mixtures that best fit the distribution of the target set scores 162. Examples of search algorithms, also referred to as optimization algorithms, operable to be used to determine the mixtures include hill-climbing or gradient search, an iterative approach in which multiple candidate mixtures near the current best are evaluated and the one that results in the greatest improvement is chosen to be the new current best; evolutionary approaches such as genetic algorithms and genetic programming, in which populations of candidate mixtures evolve in simulation based on their tightness of fit with respect to the distribution of the target set scores 162; and mathematical optimization techniques such as integer programming, linear programming, or mixed integer programming, in which the goodness of fit is modeled mathematically as a function of the weighting factors for each distribution in the mixture and this goodness of fit is maximized. Other known searching algorithms are also operable to be used.

The fit evaluator 173 measures how well the distribution of the target set scores 162 is matched by the mixture generated by the mixture generator 172 from the $P_{POS}$ scores 163, and $P_{NEG}$ scores 164. For example, the fit evaluator 173 evaluates the mixtures and determines goodness of fit between the mixture and the distribution for the target set scores 162, and is operable to generate a value representing the error in the match between a mixture and the distribution of the target set scores 162. This is shown as the measured error of the fit 181 in FIG. 2. A mixture that is a good fit, for example, is the mixture that is the best fit or one of the best fits to the distribution of the target set scores 162, such as a mixture that is a better fit than at least one other mixture.

In one embodiment, during calibration scores are clipped. For example, scores are removed from the target distribution before curve fitting. For example, target scores 162 that are greater than a threshold or less than another threshold, such as scores that would be at the ends of a bell curve, are treated separately as certainly positive or certainly negative, and are added to the final count 180 after the execution of the count determinator 170. In one embodiment, the upper threshold for clipping is selected as the maximum of the $P_{POS}$ scores 163. In another embodiment, the upper threshold is selected as the maximum of the $P_{POS}$ scores 163 and the $P_{NEG}$ scores 164. Similarly, a minimum for a lower threshold is determined. Clipping improves the accuracy of the count estimate 180 in many cases.

According to an embodiment, the fit evaluator 173 performs curve fitting by comparing two CDF curves, such as a CDF curve for the mixture of the $P_{POS}$ scores 163 and $P_{NEG}$ scores 164 and a CDF curve for the target scores 162. For example, the curve determinator 171 determines CDF curves for the $P_{POS}$ scores 163 and the $P_{NEG}$ scores 164, and the target set scores 162. The mixture determinator 172 determines a mixture of the $P_{POS}$ scores 163 and $P_{NEG}$ scores 164 including a CDF curve for the mixture. FIG. 4A illustrates an example of a CDF curve 401 for a mixture including a 70% weighting on the scores for the negative cases in the training set 122 and a 30% weighting on the scores for the positive cases. FIG. 4A also shows the CDF curve 410 for the target set scores 162.

As described above, the mixture determinator 172 is operable to determine several mixtures to identify a mixture that best fits the distribution of the target scores 162. For example, FIG. 4A illustrates one mixture 401. FIG. 4B illustrates a new mixture 402 generated by the mixture determinator 172 that better matches the CDF curve 410 for the target set scores 162. The new mixture 402, for example, is used to determine the count 180.

In one embodiment, the fit evaluator 173 uses a known technique for comparing CDF curves, such as Kolmogorov-Smirnov or Anderson-Darling, to determine the maximum difference between the CDF curves for all the scores in the distributions. Other known methods for computing the area between the curves, such as Monte Carlo simulation or numeric integration by trapezoidal approximation, are also operable to be used by the fit evaluator 173 for comparing curves.

If PDF curves are generated and compared for curve fitting, the well known Chi-Squared statistic or another known statistic is used to compare PDF curves. According to another embodiment, CDF curves are compared using a P-P plot, such as described with respect to FIG. 5.

Figure 5:
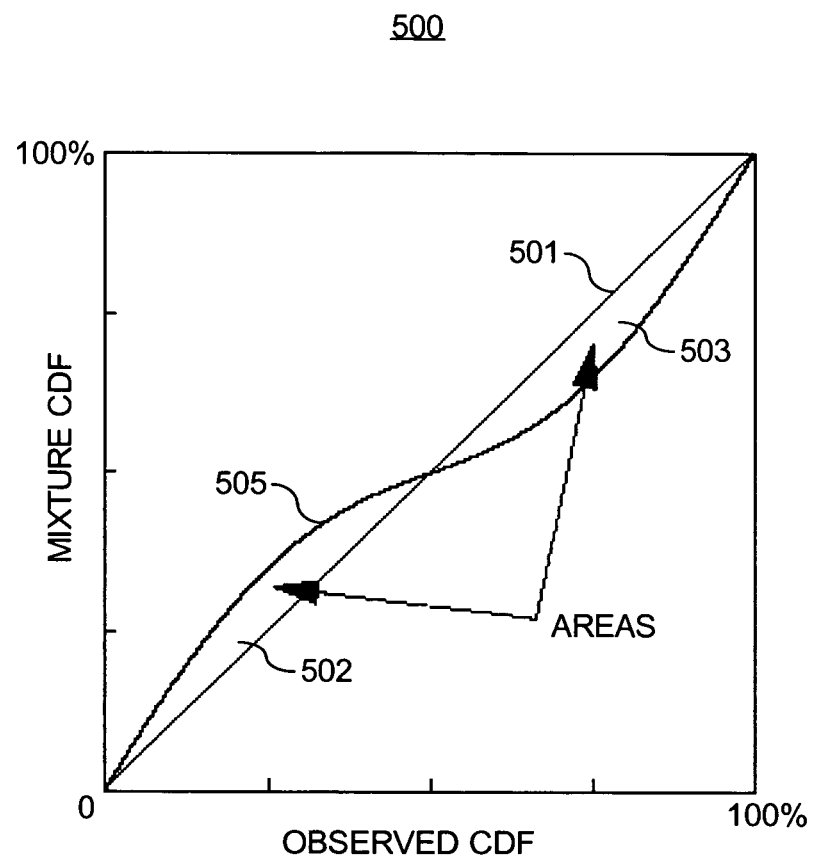
FIG. 5 illustrates a probability-probability plot, according to an embodiment.

As described above, the fit evaluator 173 uses known techniques to compare the CDF curves or uses a probability-probability (P-P) plot according to an embodiment. FIG. 5 illustrates a P-P plot 500 of a mixture cumulative distribution, such as the CDF curves 401 or 402 shown in FIGS. 4A-B, versus an observed cumulative distribution, such as the target scores CDF curve 410. Given two cumulative distributions, a well-known method for visually comparing them is to plot one versus the other while varying their input threshold, yielding a curve 505. If the two cumulative distributions yield the same probability at each input, then they generate a perfect 45° line 501. By sighting down this line, an intuitive feel for the level of agreement between two cumulative distributions is determinable, commonly to decide whether an empirical distribution matches a parametric distribution. To reduce this linearity test to computation, in one embodiment the mean-squared-error (MSE) of the points on the curve 505 to the 45° line 501 are measured. MSE, however, is highly sensitive to the maximal difference, as is Kolmogorov-Smirnov.

According to an embodiment, the difference between two cumulative distributions is determined from the area where the curve 505 deviates from the 45° line. FIG. 5 illustrates a 45° line 501 for matching cumulative distributions. FIG. 5 also illustrates areas 502 and 503 where the PP curve deviates from the 45° line 501. The areas 502 and 503 are integrated, totaling the area of any deviations form the line 501, to determine the differences between the cumulative distributions. One way to perform this integration is to walk along, without loss of generality, the "observed CDF" axis and, at some periodic interval, such as 1% or 0.1%, compute the absolute value of the difference between that value and the "Mixture CDF" value that corresponds to that "observed CDF" value along the curve 505. The sum of the absolute differences, when multiplied by the interval size, gives an approximation to the total area of the deviations.

Figure 6:
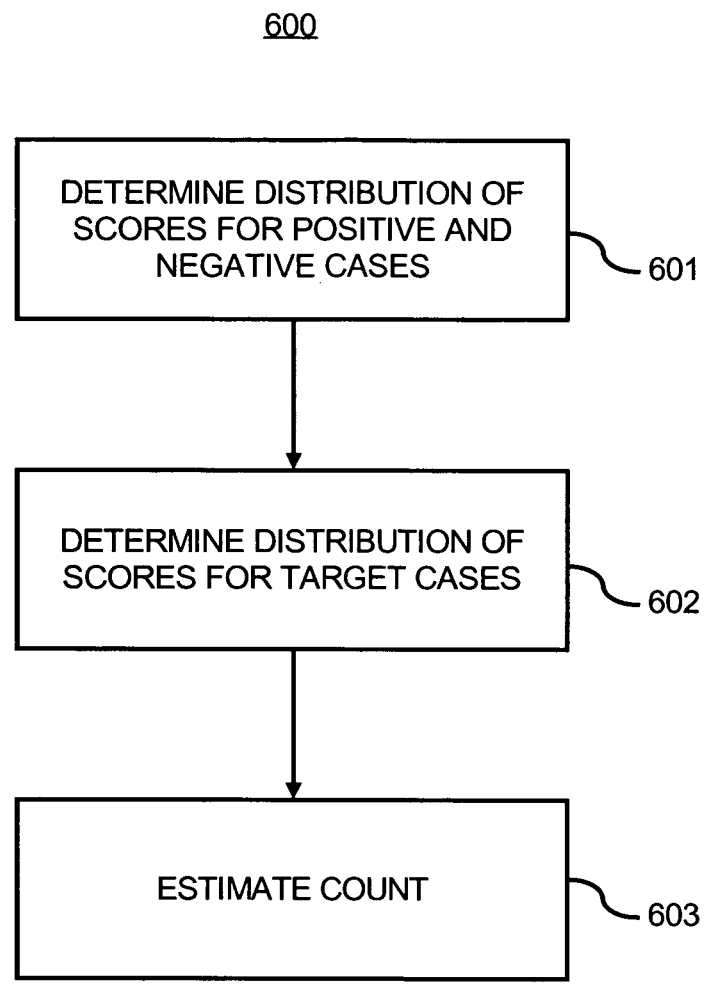
FIG. 6 illustrates a flow chart of a method for estimating a count, according to an embodiment.

FIG. 6 illustrates a method 600 for determining a count, according to an embodiment. The method 600 is described with respect to FIGS. 1-5 by way of example and not limitation.

At step 601, the count determinator 170 determines the distributions of the $P_{POS}$ scores 163 and the $P_{NEG}$ scores 164.

The distributions, for example, are CDFs or PDFs. FIG. 3 illustrates examples of PDF distribution curves for the $P_{POS}$ scores 163 and the $P_{NEG}$ scores 164. FIGS. 4A-B illustrate examples of CDF mixtures for the $P_{POS}$ scores 163 and the $P_{NEG}$ scores 164. The distributions of the $P_{POS}$ scores 163 and the $P_{NEG}$ scores 164 and the mixture are characteristic of the performance of the classifier 130, because these distributions are determined from the cases in the training set 122 using cross-validation, random repeated sampling or other techniques.

At step 602, the count determinator 170 determines a distribution of scores for the target set scores 162. The distribution for example is a CDF or a PDF.

At step 603, the count determinator 170 determines a proportion of a number of the cases in the target set 140 that are positive cases by fitting the distributions of the $P_{POS}$ scores 163 and the $P_{NEG}$ scores 164 to the distribution of the target set scores 162. The determined proportion, for example, is the count 180. Curve fitting to determine the count 180, for example, is determined by fitting a mixture of the $P_{POS}$ scores 163 and the $P_{NEG}$ scores 164 to the distribution of the target set scores 162. The mixture is also a distribution of scores comprising a weighed sum of the distributions for the $P_{POS}$ scores 163 and the $P_{NEG}$ scores 164.

According to an embodiment, several mixtures are generated and evaluated, for example, by a control loop including the mixture determinator 172 and the fit evaluator 173. The evaluation process, for example, includes selecting a mixture which is a good fit for determining the count 180. The evaluation process is also operable to be performed for the embodiments described with respect to the methods 800 and 1000 below.

Figure 7:
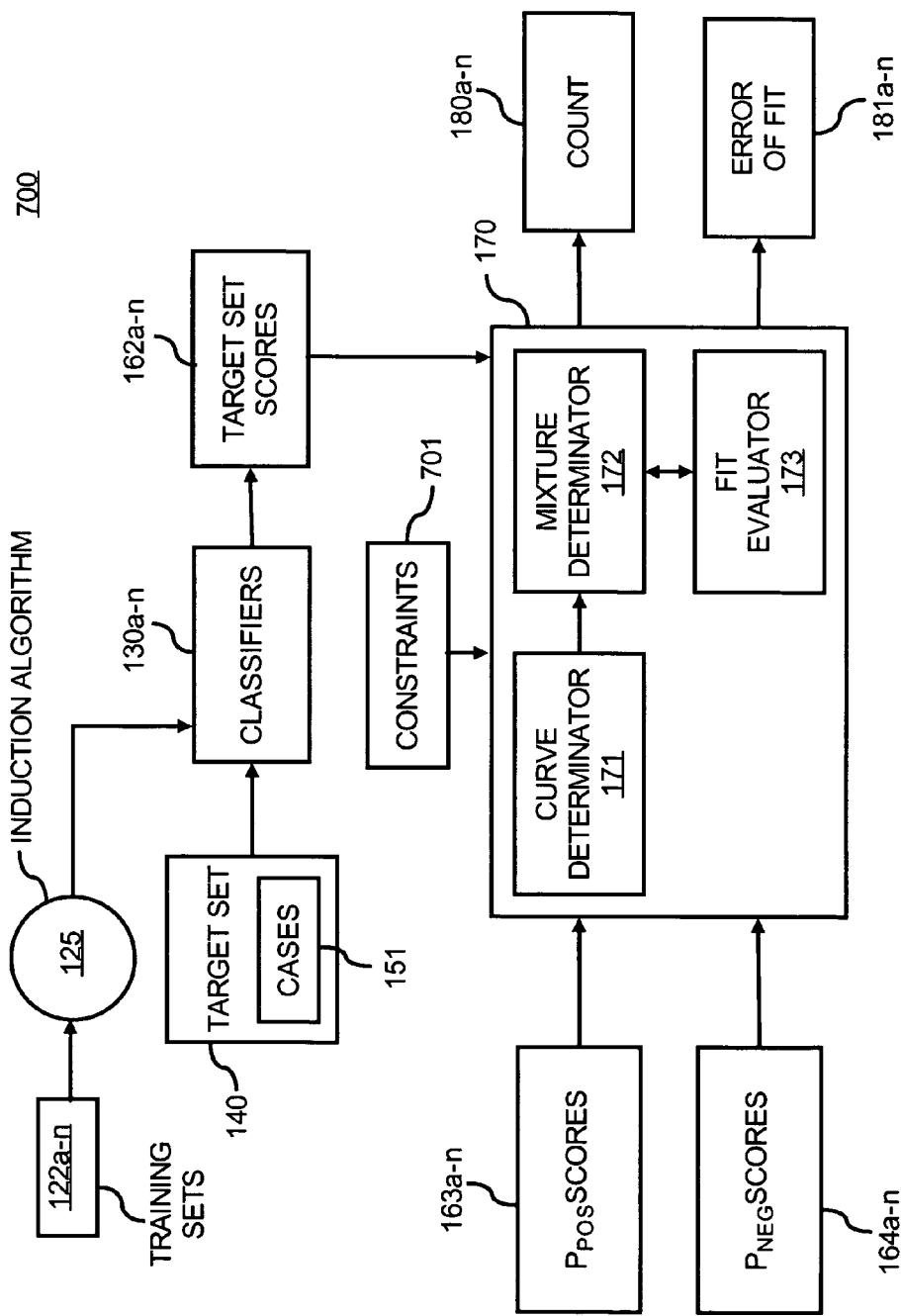
FIG. 7 illustrates another system for determining a count of cases, according to an embodiment.

FIG. 7 illustrates a system 700 that is an embodiment of the system 100 shown in FIG. 1 using multiple classifiers 130a-n operable to classify cases for categories a-n having training sets 122a-n, which may overlap. Each of the classifiers 130a-n are trained using a respective training set of the training sets 122a-n. For example, as described above with respect to FIG. 1, the training sets 122a-n include labels and training cases, not shown in FIG. 7. In the training phase, the training sets 122a-n are used as input for the induction algorithm 125 to generate the classifiers 130a-n. After the classifiers 130a-n are trained, the classifiers 130a-n classify cases without labels, such as the cases 151 in the target set 140.

The classifiers 130a-n determine $P_{POS}$ scores 163a-n and the $P_{NEG}$ scores 164a-n using cross-validation, random repeated sampling, or other known techniques, such as described above with respect to the classifier 130 and the $P_{POS}$ scores 163 and the $P_{NEG}$ scores 164 shown in FIG. 1. The classifiers 130a-n also determine the target set scores 162a-n for the target set 140. The count determinator 170 determines counts 180a-n for the positive cases in each of the categories a-n by curve fitting distributions for the $P_{POS}$ scores 163a-n and the $P_{NEG}$ scores 164a-n to the target set scores 162a-n. For example, a mixture of the distributions for the $P_{POS}$ scores 163a and the $P_{NEG}$ scores 164a is fitted to a distribution of the target set scores 162a to determine the count 180a; a mixture of the distributions for the $P_{POS}$ scores 163b and the $P_{NEG}$ scores 164b is fitted to a distribution of the target set scores 162b to determine the count 180b; and so on for each of the categories a-n to determine the counts 180a-n. Also, a measured error of the fit 181a-n may be determined for each of the counts 180a-n.

According to an embodiment, the count determinator 170 determines the counts 180a-n such that the constraints 701 are satisfied. The constraints 701 include one or more constraints. One example of a constraint is that the categories a-n are mutually exclusive, and thus the sum of the counts 180a-n is constrained to be 100%, which is the total number of cases in the target set 140. For example, the categories a-n comprise sports, health, and world news. An example of a set of counts determined by the mixture determinator 172 for these categories comprising 25%, 15%, and 60%, which sum to 100%. The mixture determinator 172 searches for sets of mixtures for the categories a-n that are determined by the fit evaluator 173 to be good fits to the respective target set scores 162a-n. A search algorithm described above is operable to be used to determine mixtures, and in one embodiment the search algorithm only considers sets of mixtures whose corresponding counts 180a-n satisfy the constraints 701. Other types of constraints are operable to be used as input to the count determinator 170, such as a constraint that cases are positive for more than one of the categories a-n. Also, the constraints 701 are optional, and the counts 180a-n are determinable without constraints.

A measured error of the fit 181a-n is determined for each of the counts 180a-n, according to an embodiment. For example, it would be useful to determine error bars or sensitivity figures on each of the counts 180a-n, representing the measured errors of the fits. Some of the classifiers 180a-n, for example, are more accurate than other classifiers, which results in different fit errors. In one embodiment, the error of the fit characterizes instead the degree of slack in each of the counts for the different categories a-n. For example, the output 181a-n for each category indicates the largest and smallest count such that the fit evaluator 173 score is no more than, for example, 5% larger than the fit evaluator 173 score at the count output; this helps the users understand for which categories the counts 180a-n are most certain compared with others.

According to another embodiment, one or more of the categories a-n are not considered when determining the counts 180a-n. For example, there may be a special "miscellaneous" class that catches all other examples. For example, the count determinator 170 is used to estimate the number of tech support calls that are about "cracked screens" on a PDA, which is category a, and the number of tech support calls that are about "battery problems", which is category b. However, there may be a large volume of calls about other issues. When the count determinator 170 determines the counts 180a-b for the categories a-b, the sum of the counts 180a-b should not equal the total number of technical support calls because the remaining technical support call, which, for example, are classified in the "miscellaneous" category, are not to be counted. Thus, in this embodiment, some of the curves for the categories a-n are fitted to determine the counts for those categories.

Figure 8:
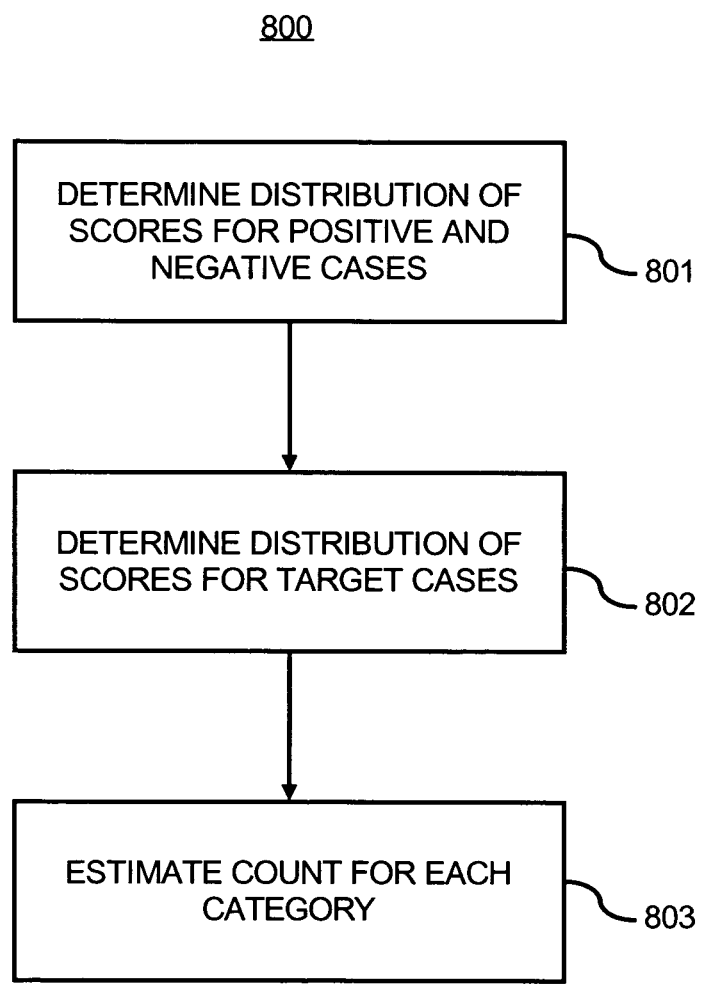
FIG. 8 illustrates a flow chart of another method for estimating a count, according to an embodiment.

FIG. 8 illustrates a method 800 for determining counts for multiple categories, according to an embodiment. The method 800 is described with respect to FIG. 7 by way of example and not limitation.

At step 801, the count determinator 170 determines the distributions of the $P_{POS}$ scores 163a-n and the $P_{NEG}$ scores 164a-n. The distributions, for example, are CDFs or PDFs. The distributions of the $P_{POS}$ scores 163a-n and the $P_{NEG}$ scores 164a-n and their mixtures are characteristic of the performance of the classifier 130a-n, because these distributions are determined from the cases in their training sets using cross-validation or other techniques.

At step 802, the count determinator 170 determines a distribution of scores for the target set scores 162. The distribution for example is a CDF or a PDF.

At step 803, the count determinator 170 determines the proportions of the cases in the target set 140 that are positive cases for the categories a-n by fitting the distributions of the $P_{POS}$ scores 163a-n and the $P_{NEG}$ scores 164a-n to the distribution of the target set scores 162. The determined proportions, for example, are the counts 180a-n.

According to an embodiment, mixtures are determined for each set of $P_{POS}$ scores 163a-n and the $P_{NEG}$ scores 164a-n, such as a mixture for $P_{POS}$ scores 163a and the $P_{NEG}$ scores 164a, a mixture for $P_{POS}$ scores 163b and the $P_{NEG}$ scores 164b, etc. The mixture determinator 172 uses the fit evaluator 173 to determine each mixture as a relatively good fit to the distribution of scores for the target set scores 162 to determine the counts 180a-n. The fit evaluator 173 is also operable to determine the error of fit 181a-n for each of the curve fittings. In one embodiment, the mixture determinator 172 determines the mixtures ensuring that the constraints 701 are satisfied. For example, the mixture evaluator determines the mixtures such that the counts 180a-n sum to 100% for mutually exclusive categories. In one embodiment, counts are determined for only some of the categories a-n by fitting curves for only some of the categories, such as to accommodate miscellaneous categories that do not necessarily need to be counted.

Figure 9:
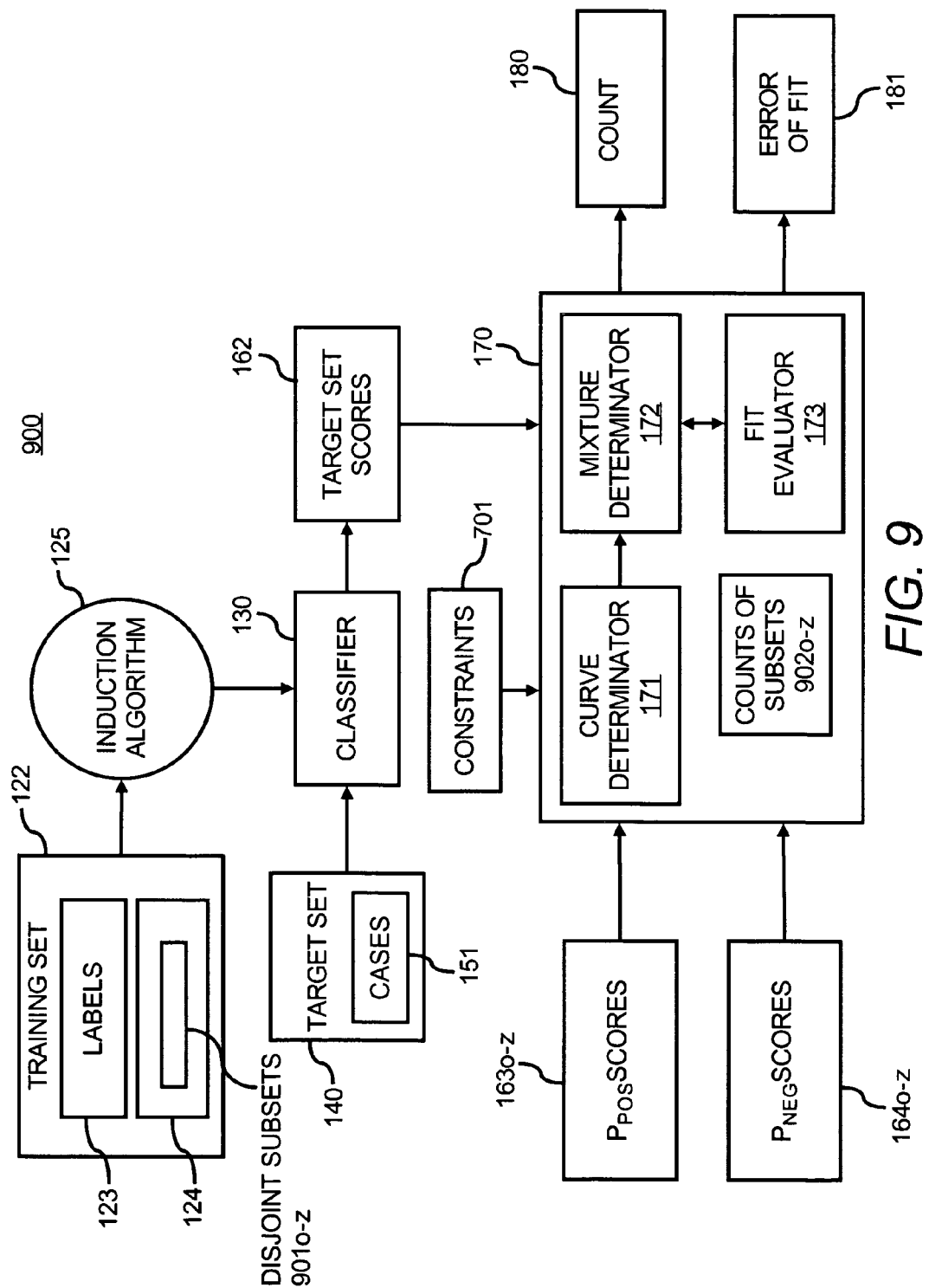
FIG. 9 illustrates yet another system for determining a count of cases, according to an embodiment.

According to an embodiment, instead of determining multiple counts 180o-z or in addition to determining the multiple counts 180o-z for each subclass, the count determinator 170 determines a single count 180 that represents the total estimated count of the positive class. FIG. 9 illustrates a system 900 including another embodiment of the system 100 shown in FIG. 1. In the system 900, the training set 122 is considered to comprise disjoint, but not necessarily exhaustive, subsets 901o-z of cases 124. The disjoint subsets are mutually exclusive and there is no overlap between subsets. The classifier 130 is trained as before using the entire training set 122.

The classifier 130 is also used to determine $P_{POS}$ scores 163o-z and $P_{NEG}$ scores 164o-z comprising scores for each of the positive and negative cases within each of the subsets 901o-z. For example, a set of $P_{POS}$ scores and $P_{NEG}$ scores are determined for each subset 901o-z. The curve determinator 171 determines a distribution, for example, a PDF or CDF, for each of the sets of $P_{POS}$ scores 163o-z and $P_{NEG}$ scores 164o-z.

The classifier 130 generates target set scores 162 for the target set 140, and the curve determinator 171 determines a distribution corresponding to this. The mixture determinator 172 determines a mixture comprising a weighted combination of the distributions of the $P_{POS}$ scores 163o-z and the distributions of the $P_{NEG}$ scores 164o-z. According to some embodiments, during the evaluation process, several mixtures are determined and evaluated to find a mixture comprised of a combination of all the distributions of the $P_{POS}$ scores 163o-z and the distributions of the $P_{NEG}$ scores 164o-z that is a good fit to the distribution of the target set scores 162 as adjudged by the fit evaluator 173.

This process of selecting a mixture of the distributions of the $P_{POS}$ scores 163o-z and $P_{NEG}$ scores 164o-z that most closely fits the distribution of the target set scores 162 as adjudged by the fit evaluator 173 is known as fitting the former distributions to the latter distribution. The selected mixture is used to determine subset counts 902o-z, which are based on the weights associated with the respective positive distributions $P_{POS}$ 163o-z in the determined mixture. In an embodiment, the sum of the subset counts is taken as the overall count 180. Also, a measured error of the fit 181 may be determined for the fit. In an alternative embodiment, subset counts 902o-z are not explicitly determined and count 180 is determined based on the sum of the weights associated with the positive distributions $P_{POS}$ 163o-z.

During the evaluation process, a known optimization algorithm is used to find one or more mixtures that best fit the distribution of the target set scores 162. Examples of optimization algorithms operable to be used to determine the mixtures include hill-climbing or gradient search, an iterative approach in which multiple candidate mixtures near the current best are evaluated and the one that results in the greatest improvement is chosen to be the new current best; evolutionary approaches such as genetic algorithms and genetic programming, in which populations of candidate mixtures evolve in simulation based on their tightness of fit with respect to the distribution of the target set scores 162; and mathematical optimization techniques such as integer programming, linear programming, or mixed integer programming, in which the goodness of fit is modeled mathematically as a function of the weighting factors for each distribution in the mixture and this goodness of fit is maximized. Other known searching algorithms are also operable to be used.

The subsets 901o-z represent any partitioning of the training cases 124. In one embodiment, the subsets 901o-z are obtained by clustering the training cases 124 using a known-method clustering technique such as k-means, the clustering being based on any data associated with the training cases 124 and the resulting clusters used to form the subsets 901o-z. In another embodiment training cases 124 are partitioned into subsets 901o-z based on data associated with the cases 124. For example, cases may be assigned to subsets based on the type of product, the sex of the caller, or the age of the product. For continuous data like age or price, subsets may be defined by non-overlapping, though not necessarily equal-sized, ranges of values.

In a further embodiment, subsets 901o-z are determined based on indications that the case is to be considered a positive case for other categories than the category for which the classifier 130 is trained. When the categories form a hierarchy, likely categories to use include categories which are child categories or descendent categories of the category for which the classifier 130 is trained. The indications used may be based on labels 123 associated with the cases 124 in the training set 122. Alternatively, they may be based on decisions made by other binary or multi-class classifiers (not shown) associated with the other categories. As it is important that each of the training cases 124 be assigned to at most one subset 901o-z, if there is indication that a training case is a positive case for two categories A and B, special care is taken. In such situations, in one embodiment, a new subset is created for all training cases 124 that are in both A and B. Alternatively, one of A or B is defined to take precedence and its subset would receive all such cases. Such precedence is defined, for example, by dominance in a hierarchy, by level in a hierarchy, by size of the non-overlapping portion of the subset. Further alternatively, the choice of which subset to use is decided randomly or in round-robin fashion at the time each such training case 124 is processed. Yet further alternatively, such situations cause one of A and B to be removed from further consideration and its associated subset ignored. If the indication is performed based on a score returned by binary classifiers associated with categories A or B, the one associated with the classifier returning the score indicating greatest likelihood or confidence is chosen.

Figure 10:
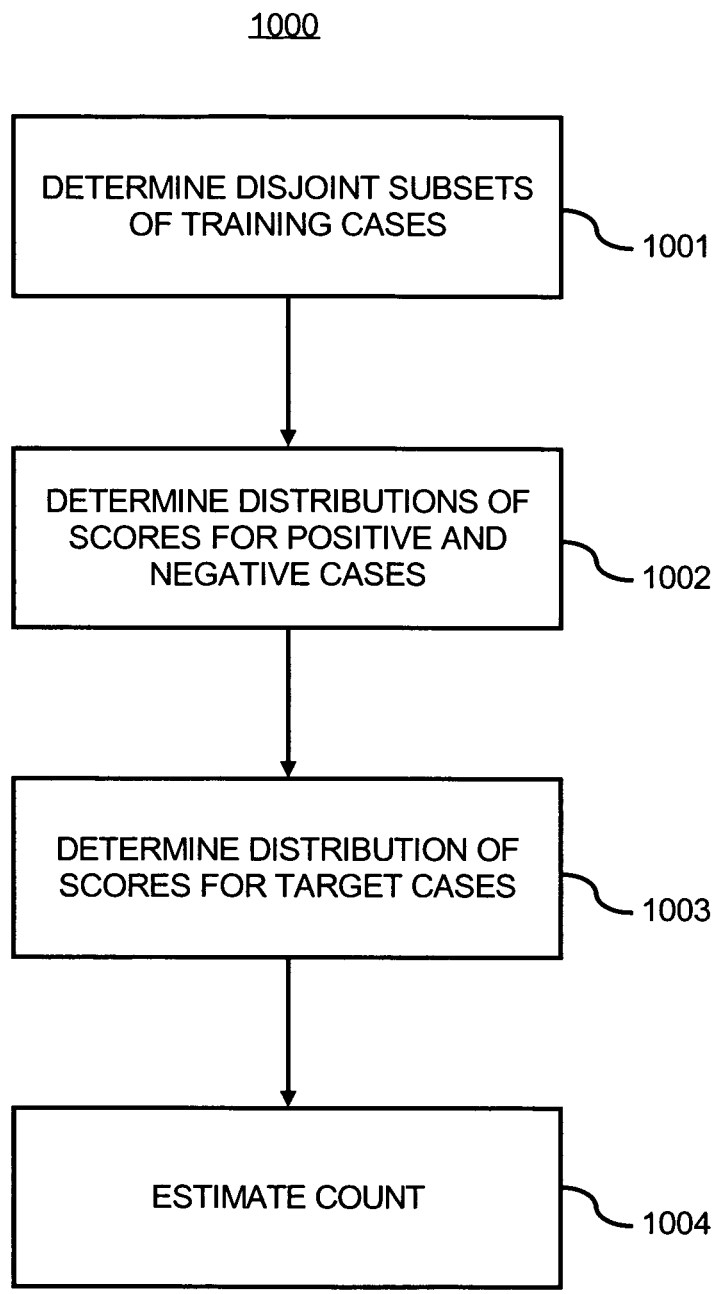
FIG. 10 illustrates a flow chart of yet another method for estimating a count, according to an embodiment.

FIG. 10 illustrates a method 1000 for determining counts for a category, according to an embodiment. The method 1000 is described with respect to FIG. 9 by way of example and not limitation.

At step 1001, the count determinator 170 determines disjoint subsets 901o-z of the training cases 124.

At step 1002, the count determinator 170 determines the distributions of the $P_{POS}$ scores 163o-z and the $P_{NEG}$ scores 164o-z. The distributions, for example, are CDFs or PDFs. The distributions of the $P_{POS}$ scores 163o-z and the $P_{NEP}$ scores 164o-z are characteristic of the performance of the classifier 130, because these distributions are determined from the cases in their training sets using cross-validation or other techniques.

At step 1003, the count determinator 170 determines a distribution of scores for the target set scores 162. The distribution for example is a CDF or a PDF.

At step 1004, the count determinator 170 estimates the count 180. For example, the count determinator 170 determines the proportion of the cases in the target set 140 that are positive cases for the category by fitting the distributions of the $P_{POS}$ scores 163o-z and the $P_{NEG}$ scores 164o-z to the distribution of the target set scores 162. The determined proportion, for example, is the count 180.

According to an embodiment, multiple mixtures are determined and evaluated to select a mixture that is a good fit for the distribution of scores for the target set scores 162. The mixture in this embodiment comprises a mixture of the distributions of the $P_{POS}$ scores 163o-z and the $P_{NEG}$ scores 164o-z. The mixture, for example, is a weighted sum. Different mixtures are generated for evaluation, for example, by using a search technique described above.

The fit evaluator 173 is used to determine the goodness of fit of a given mixture to the distribution of target set scores 162. The fit evaluator 173 is also operable to determine the error of fit 181 for the curve fittings.

The embodiments involving multiple classifiers for multiple categories and the embodiments involving multiple subsets for a classifier are operable to be used together or separately. A single instance of a system practicing the embodiments, for example, involves multiple categories a-n, each of whose training sets comprises multiple subsets 901o-z, not necessarily defined by the same criteria for each category. The multiple induced classifiers 130a-n therefore determine target set scores 162a-n, $P_{POS}$ scores 163a-n and $P_{NEG}$ scores 164a-n. Each $P_{POS}$ scores 163a-n comprises a set of $P_{POS}$ scores 163o-z, one for each subset 901o-z, and analogously for $P_{NEG}$ scores 1642a-n. The mixture determinator 172 uses the fit evaluator 173 to determine a set of mixtures, each mixture comprising distributions of $P_{POS}$ scores 163o-z and $P_{NEG}$ scores 164o-z, the resulting counts 180a-n satisfying any constraints 701.

Figure 11:
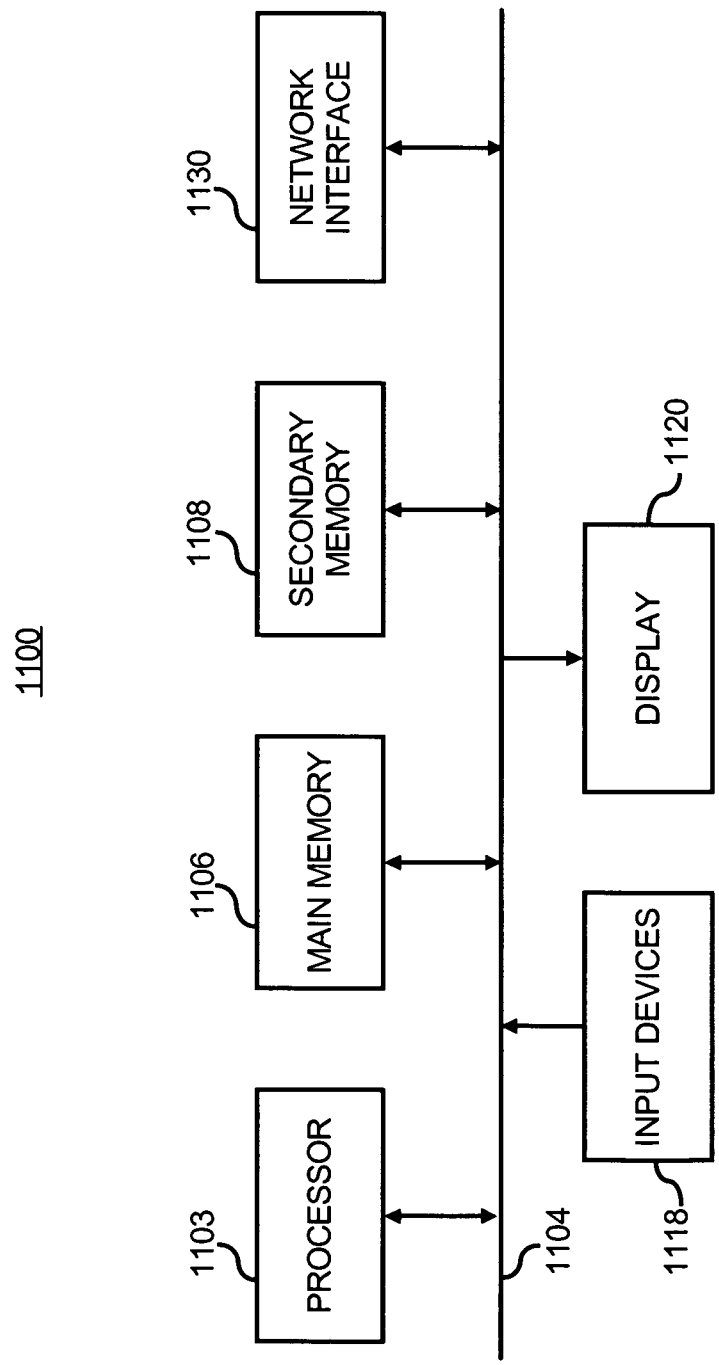
FIG. 11 illustrates an embodiment of a computer system operable to be used for embodiments described herein.

FIG. 11 illustrates an embodiment of a computer system 1100 for executing the count determinator 170 shown in FIGS. 1, 2, 7 and 9. The computer system 1100 is also operable to be used to train and run the classifiers described above. The computer system 1100 includes one or more processors, such as processor 1103, providing an execution platform for executing software. The count determinator 170 and the classifiers, for example, comprise software executed by the processor 1103. Commands and data from the processor 1103 are communicated over a communication bus 1104. The computer system 1100 also includes a main memory 1106, such as a Random Access Memory (RAM), where software is resident during runtime, and a secondary memory 1108. The secondary memory 1108 includes, for example, a hard disk drive or other type of storage device. The secondary memory 1108 may also include ROM (read only memory), EPROM (erasable, programmable ROM), EEPROM (electrically erasable, programmable ROM).

The computer system 1100 includes optional user interfaces comprising one or more input devices 1118, such as a keyboard, a mouse, a stylus, and the like, and a display 1120.

A network interface 1130 is provided for communicating with other computer systems. It will be apparent to one of ordinary skill in the art that the computer system 1100 includes more or less features depending on the complexity of system needed for running the systems described above.

The steps of the methods described above and other steps described herein are operable to be implemented as software embedded on a computer readable medium, such as the memory 1106 and/or 1108, and executed on the computer system 1100, for example, by the processor 1103.

The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. At least one computer program provided on at least one non-transitory computer readable storage medium and comprising code that when executed causes at least one computer to perform a method comprising:

training a machine learning classifier with a set of labeled training data, such that the trained classifier is operable to determine a score with respect to the classification of cases for a category;

determining at least one first distribution of scores for positive cases in the training set, wherein a positive case is a case that belongs to the category;

determining at least one second distribution of scores for negative cases in the training set, wherein a negative case is a case that does not belong to the category;

determining a third distribution of scores generated by the classifier classifying cases in a set of target data; and estimating a proportion of cases in the target set that are positive cases by fitting the at least one first distribution and the at least one second distribution to the third distribution.

2. The at least one computer program of claim 1, wherein estimating a proportion of cases in the target set that are positive cases by fitting the at least one first distribution and the at least one second distribution to the third distribution further comprises:
   determining a plurality of mixtures, each of the plurality of mixtures including a combination of the at least one first and the at least one second distributions;
   evaluating how well each of the plurality of mixtures fits the third distribution;
   selecting a mixture from the plurality of mixtures based on the evaluating; and
   determining the proportion of the cases that are positive based on the selected mixture.

3. The at least one computer program of claim 2, wherein the plurality of mixtures include cumulative distributions of a combination of the at least one first and the at least one second distributions, and wherein the third distribution includes a cumulative distribution of the scores generated by the classifier classifying the cases in the set of target data, the method further comprising:
   determining a probability-probability plot including a curve generated from fitting the selected mixture to the third distribution; and
   measuring an error in fit based on the deviation of the curve from a 45" line in the probability-probability plot.

4. The at least one computer program of claim 1, wherein determining a proportion of the cases that are positive cases further comprises:
   determining a mixture comprising a weighted combination of the at least one first and at least one second distributions based on evaluating a fitting of the mixture to the third distribution; and
   determining the proportion of cases based on the weights associated in the determined mixture with the at least one first distribution.

5. The at least one computer program of claim 1, further comprising:
   removing a score from the third distribution based on a threshold before fitting the first and second distributions to the third distribution,
   wherein determining the proportion of cases further comprises considering a case associated with the score as one of positive or negative based on the threshold.

6. The at least one computer program of claim 1, further comprising:
   using one of cross-validation and repeated random sampling to determine the first and second distributions.

7. The at least one computer program of claim 1, wherein the distributions comprise cumulative distributions or probability density distributions.

8. The at least one computer program of claim 1, further comprising:
   wherein the training data comprises a plurality of disjoint subsets of cases;
   the at least one first distribution comprises a distribution of scores for positive cases determined for each subset; and
   the at least one second distribution comprises a distribution of scores for negative cases determined for each subset.

9. The at least one computer program of claim 8, further comprising:
   assigning a case to a subset based on one of clustering, an association with a predetermined category, an indication that the case is considered positive for a category other than the category for which the classifier is trained, a label associated with the case, a data value associated with the case, and a decision made by the classifier.

10. The at least one computer program of claim 2, wherein determining a plurality of mixtures further comprises:
    searching for combinations of the at least one first and the at least one second distributions that are good fits using an exhaustive search, a heuristic search, a hill-climbing search, a gradient search, a genetic algorithm, genetic programming, integer programming, linear programming, or mixed integer programming.

11. At least one computer program provided on at least one tangible non-transitory computer readable storage medium and comprising code that when executed causes at least one computer to perform a method comprising:
    training a plurality of machine learning classifiers with a plurality of training sets of labeled training data, such that each trained classifier is operable to determine a score with respect to the classification of cases for a category of a plurality of categories;
    for each of the plurality of categories, determining at least one first distribution of scores for positive cases in a training set of the plurality of training sets used to train the classifier for the category, wherein a positive case is a case that belongs to the category;
    for each of the plurality of categories, determining at least one second distribution of scores for negative cases in the training set used to train the classifier for the category, wherein a negative case is a case that does not belong to the category;
    for each of the plurality of classifiers, determining a third distribution of scores generated by the classifier classifying cases in a set of target data; and
    for at least some of the plurality of categories, estimating the proportion of cases in the target set that are positive cases by fitting the at least one first and the at least one second distributions to the third distribution.

12. The at least one computer program of claim 11, wherein for at least some of the plurality of categories estimating a proportion of cases in the target set that are positive cases further comprises:
    for at least some of the plurality of categories, estimating the proportion of cases in the target set that are positive cases while satisfying at least one constraint on the proportions.

13. The at least one computer program of claim 12, wherein the at least one constraint comprises a requirement that a sum of the proportions for all of the at least some of the plurality of categories equals 100% or a requirement that a sum of the proportions for a subset of the at least some of the plurality of categories is less than 100%.

14. At least one computer program provided on at least one tangible non-transitory computer readable storage medium and comprising code that when executed causes at least one computer to perform the following:
    training a machine learning classifier with a set of labeled training data, such that the trained classifier is operable to determine a score with respect to the classification of cases for a category;
    determining at least one first distribution of scores for positive cases in the training set, wherein a positive case is a case that belongs to the category;
    determining at least one second distribution of scores for negative cases in the training set, wherein a negative case is a case that does not belong to the category;
    determining a mixture of the at least one first distribution of scores and the at least one second distribution of scores;
    determining a third distribution of scores generated by the classifier classifying cases in a set of target data; and estimating a proportion of cases in the target set that are positive cases by fitting the mixture to the third distribution.

15. The at least one computer program of claim 14, wherein determining a mixture comprises:
   determining a plurality of mixtures, each of the plurality of mixtures including a combination of the at least one first and the at least one second distributions;
   evaluating how well each of the plurality of mixtures fits the third distribution; and
   selecting a mixture from the plurality of mixtures based on the evaluating.

16. The at least one computer program of claim 14, wherein the classifier comprises a plurality of classifiers operable to classify cases for a plurality of categories, and
   for each of the plurality of categories, determining the at least one first distribution of scores for positive cases and determining the at least one second distribution of scores for negative cases, and determining the mixture;
   for each of the plurality of classifiers, determining the third distribution of scores generated by the classifier classifying cases in the set of target data; and
   for at least some of the plurality of categories, estimating the proportion of cases in the target set that are positive cases by fitting the mixture to the third distribution.

17. The at least one computer program of claim 16, wherein for at least some of the plurality of categories estimating a proportion of cases in the target set that are positive cases further comprises:
   for at least some of the plurality of categories, estimating the proportion of cases in the target set that are positive cases while satisfying at least one constraint on the proportions.

18. The at least one computer program of claim 17, wherein the at least one constraint comprises a requirement that a sum of the proportions for all of the at least some of the plurality of categories equals 100% or a requirement that a sum of the proportions for a subset of the at least some of the plurality of categories is less than 100%.

19. The at least one computer program of claim 14, further comprising:
   wherein the training data comprises a plurality of disjoint subsets of cases;
   the at least one first distribution comprises a distribution of scores for positive cases determined for each subset; and
   the at least one second distribution comprises a distribution of scores for negative cases determined for each subset.

20. The at least one computer program of claim 19, further comprising:
   assigning a case to a subset based on one of clustering, an association with a predetermined category, an indication that the case is considered positive for a category other than the category for which the classifier is trained, a label associated with the case, a data value associated with the case, and a decision made by the classifier.

* * * * *

UNITED STATES PATENT AND TRADEMARK OFFICE
CERTIFICATE OF CORRECTION

PATENT NO. : 8,744,987 B1
APPLICATION NO. : 11/406689
DATED : June 3, 2014
INVENTOR(S) : Forman et al.

Page 1 of 1

It is certified that error appears in the above-identified patent and that said Letters Patent is hereby corrected as shown below:

In the Claims

Column 14, line 10, Claim 11, before "non-transitory" delete "tangible".

Column 14, line 51, Claim 14, before "non-transitory" delete "tangible".

Signed and Sealed this
Fourth Day of November, 2014

Michelle K. Lee
*Deputy Director of the United States Patent and Trademark Office*